Jan. 29, 1957 D. B. CHENOWETH 2,779,216
POWER DRIVEN SAW SETTER
Filed Dec. 8, 1951 9 Sheets-Sheet 1

INVENTOR.
DEAN B. CHENOWETH
BY Paul, Paul & Moore
ATTORNEYS

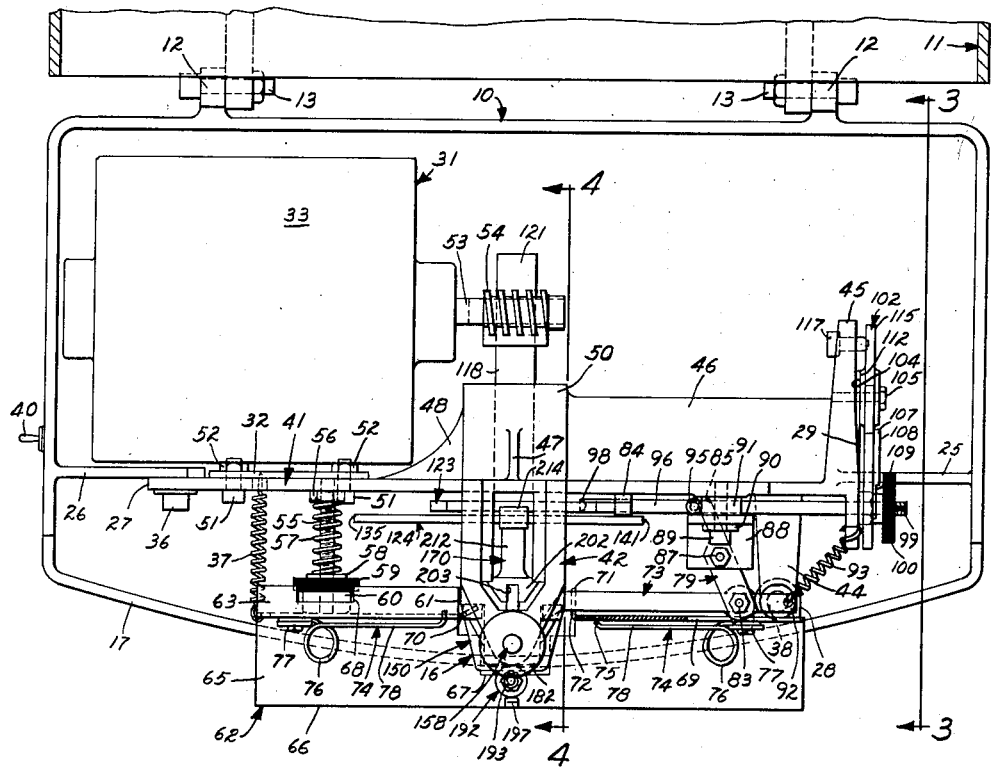
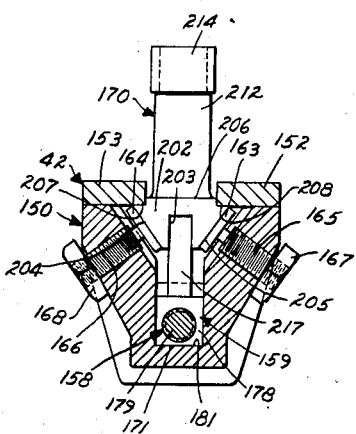

Jan. 29, 1957  D. B. CHENOWETH  2,779,216
POWER DRIVEN SAW SETTER
Filed Dec. 8, 1951  9 Sheets-Sheet 3

INVENTOR.
DEAN B. CHENOWETH
BY Paul, Paul & Moore
ATTORNEYS

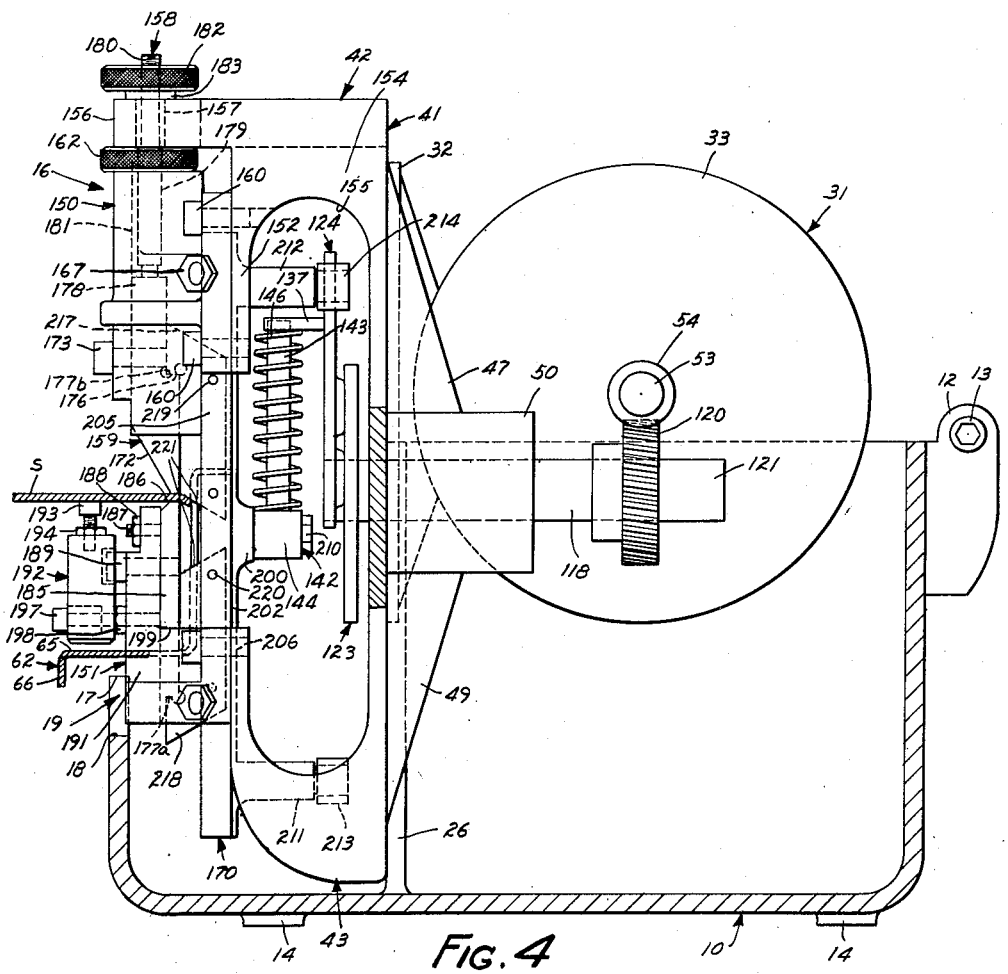
FIG. 4
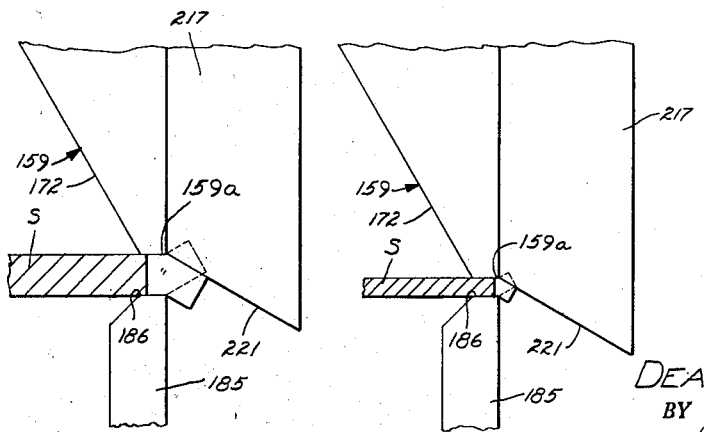
FIG. 20
FIG. 21
INVENTOR.
DEAN B. CHENOWETH
BY Paul, Paul & Moore
ATTORNEYS Jan. 29, 1957 D. B. CHENOWETH 2,779,216
POWER DRIVEN SAW SETTER
Filed Dec. 8, 1951 9 Sheets-Sheet 6

INVENTOR.
DEAN B. CHENOWETH
BY
Paul, Paul & Moore
ATTORNEYS

INVENTOR.
DEAN B. CHENOWETH
BY Paul, Paul & Moore
ATTORNEYS

INVENTOR.
DEAN B. CHENOWETH
BY Paul, Paul & Moore
ATTORNEYS

Jan. 29, 1957  D. B. CHENOWETH  2,779,216
POWER DRIVEN SAW SETTER
Filed Dec. 8, 1951  9 Sheets-Sheet 9

INVENTOR.
DEAN B. CHENOWETH
BY Paul, Paul & Moore
ATTORNEYS

United States Patent Office 2,779,216
Patented Jan. 29, 1957

2,779,216

POWER DRIVEN SAW SETTER

Dean B. Chenoweth, Minneapolis, Minn., assignor to Foley Manufacturing Company, Minneapolis, Minn., a corporation of Minnesota Application December 8, 1951, Serial No. 260,643

17 Claims. (Cl. 76—66)

This invention relates to new and useful improvements in saw setters and more particularly to new and useful improvements in power driven saw setters of the type wherein a reciprocating hammer operates to set alternate teeth of the saw in one pass through the setter.

It is an object of this invention to provide a hammer type saw setter which provides integral reciprocating hammers to act on both sides of the saw to swage the saw teeth in alternate directions in one pass through the machine.

It is a further object of this invention to provide a hammer type saw setter in which the tooth being set is bent over a corner of the anvil rather than flattened against an anvil face.

It is a further object of this invention to provide a hammer type saw setter in which a saw may be set after sharpening and in which hard saws and saws with hard spots may be set without the breakage of the teeth.

It is a further object of this invention to provide a saw setter in which the teeth of the saw may be set after they have been sharpened without the consequent dulling thereof.

It is a further object of this invention to provide a hammer type saw setter wherein the stops for the limitation of the hammer travel are integral with the hammers.

It is a further object of this invention to provide a hammer type saw setter wherein the distance between the stops for the hammers is adjusted by the movement of the vice-jaw so as to be continuously and automatically adjustable to the thickness of various saws grasped by the vice.

It is a further object of this invention to provide a saw setter wherein a single power spring actuates a pair of hammers to deliver a setting blow to alternate sides of the saw blade and set alternate teeth in opposite directions as the saw travels therethrough.

It is a further object of this invention to provide a hammer type saw setter in which a reciprocating pair of hammers travelling always in one plane is actuated by a single power spring.

It is a further object of this invention to provide an efficient and unique cam to cock and fire a hammer type saw setter employing reciprocating hammers.

It is a further object of this invention to provide a cam and spring means for delivering force to a reciprocating pair of hammers travelling always in one plane, said cam causing said spring to revolve, load and deliver the setting power to drive the hammers to alternate directions after every 180° of revolution.

It is a further object of this invention to provide a saw setter employing reciprocating hammers having a synchronized fed pawl wherein the feed pawl moves the saw through the machine to position the teeth of the saw under the reciprocating hammers.

It is a further object of this invention to provide a saw setter of the type employing a pair of integrally connected reciprocating hammers adapted to operate to swage alternate teeth of a saw in the same direction and adapted to deliver the same amount of force to said teeth no matter in which direction they are set.

It is another and further object of this invention to provide a saw setter having a cam and spring operated reciprocating hammer unit holding reciprocating hammers in spaced relation for swaging the teeth of the saw to be set and having a feed pawl mechanism adapted to feed said saw through said setter between blows of said hammers.

It is a further object of this invention to provide a saw setter having a unique means for adjusting the amount of the feed of such setter to the size of the teeth of the saw.

It is a further object of this invention to provide a saw setter of the type wherein a unitary cam structure comprised of a setter cam and a feeding cam operates to alternately feed and set the teeth of said saw.

It is a further object of this invention to provide a hammer type saw setter employing a pair of setting hammers integrally connected wherein the limit of travel of one of said hammers is limited by the fixed position of one of the vice jaws and the limit of travel of the other of said hammers is determined by the adjustable position of the other of said vice jaws.

Other and further objects of this invention will be those apparent and inherent in the apparatus as pictured, described and claimed.

This invention will be described with reference to the drawings in which corresponding numerals refer to the same parts and in which:

Figure 2 is a top plan view of the instant invention with the cover partially broken away;

Figure 4 is a view taken along the lines 4—4 of Figure 2;

Figure 7 is a sectional view of the top vice jaw showing the gibs or bearing pads therefor and taken along the lines 7—7 of Figure 3;

Figure 8 is a partially schematic view illustrating the position of the cam and spring and hammer rollers showing the mechanism in the fired upward position;

Figure 9 is a view similar to Figure 8 but showing the lower hammer in backed-off position;

Figure 10 is a view similar to Figures 8 and 9 but showing the cam surface about to engage the upper hammer roller;

Figure 11 is a view similar to Figures 8–10 but showing both the upper and lower hammer rollers engaged by the cam surface;

Figure 12 is a view similar to Figures 8–11 but showing the cam surface engaging the upper hammer roller and freed from the lower hammer roller;

Figure 13 is a view similar to Figures 8–12 but showing the upper hammer roller in cocked position;

Figure 14 is a view showing the upper hammer in fired down position;

Figure 15 is a view similar to Figure 9 and showing the upper hammer roller in backed-off position;

Figure 16 is a view similar to Figure 10 and shows the cam surface about to engage the lower hammer roller;

Figure 17 is a view similar to Figures 12–16 but showing both rollers being engaged by the cam surface;

Figure 18 is a view similar to Figures 8–17 but showing the upper hammer roller being freed from the cam surface;

Figure 19 is a view similar to Figure 13 but showing the lower hammer cocked and about to fire;

Figure 20 is a view of the vice jaws of the instant invention engaging a thick saw blade and of the upper hammer swaging a tooth downward thereon;

Figure 21 is a view similar to Figure 20 but showing the vice jaws engaging a thin saw blade;

Figure 1:
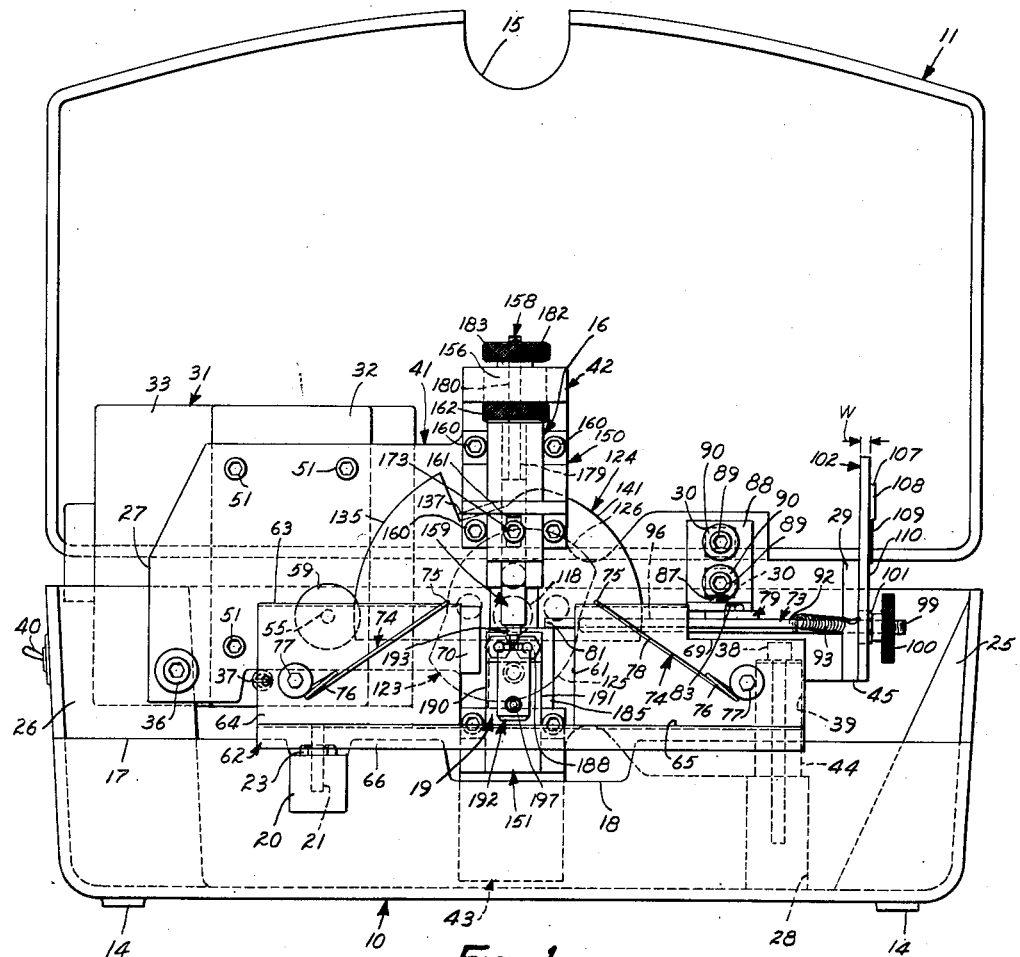
Figure 1 is a front elevation of the setter of the instant invention showing the cover swung open.

Referring now the the drawings, particularly to Figure 1, there is illustrated the saw setter of the instant invention enclosed in a covering box having a bottom generally designated 10, a cover generally designated 11 hinged thereto by hinges 12 which are provided with pivot bolts 13. The bottom 10 of the box is provided with four attached rubber grommets or base pads 14 which are conventional in nature and may be attached thereto in any desired fashion and form no part of this invention per se. The cover section or top section 11 is provided with a semi-circular recess 15 at the top and extending down the front thereof which allows to protrusion of the upper vice jaw assembly 16 therethrough when the cover section is closed. The bottom of the box 10 is cut away throughout the front thereof and has an upstanding edge 17 provided with a central recess 18 through which the bottom vice jaw assembly 19 is adapted to protrude as is seen with reference to Figure 1. A protruding boss 20 is provided thereon which is adapted to receive an adjustment screw 21 which determines the position of guide plate 62. The adjustment screw 21 is maintained in fixed position by use of hexagonal nut 23.

The cover section 11 and the bottom section 10 which form the box for enclosing the apparatus may be made as desired but are usually cast and provided with an attractive crackle finish. Air-vents or louvers of one sort or another may be positioned throughout the box as desired in order to exhaust heat generated by the operation of the motor. A switch 40 is provided on one side of the box for starting and stopping the electric motor for the operation of the saw setter.

The bottom section of the box 10 is provided at the interior thereof with a triangular web 25 at one side. This is not used for supporting the structure of the setting mechanism proper but merely gives added strength to the box.

At the other side of the box and oppositely disposed thereto is provided a rectangular inwardly extending web 26 upon which the left end 27 of the setter apparatus is adapted to be supported. The right end 29 of the setter apparatus is adapted to be supported on a boss 28 which projects rearwardly into the box interior, is apertured for the reception of bolt 38, and adapted to receive the right end section 29 of the setter assembly thereon, as may be best seen with reference to Figures 1 and 2.

The left end 27 of the setter apparatus is positioned on the front side of the web and secured thereto by an Allenhead bolt and washer 36. The right end section of the center apparatus is supported upon the upper face of boss 28 and is secured thereto by an Allenhead bolt and washer 38. The Allenhead bolt and washer 38 is spaced from the upper surface of boss 28 by hexagonal collar 39 as will be hereinafter explained.

The setter apparatus proper consists of a vertical web 41 having a left end 27 and a right end 29, and extending longitudinally of the bottom 10 as may best be seen with reference to Figures 1 and 2. It has a projecting upper vice jaw frame 42 and a projecting lower vice jaw frame 43. It has a forwardly projecting arm 44 at the right end 29 thereof adapted to seat on boss 28. Integrally connected with the right end 29 of the vertical web 41 is a fan-shaped plate 45 positioned at right angles thereon as is best shown with reference to the dotted lines of Figure 3 and extending rearwardly therefrom. Also, extending rearwardly from the vertical web 41 is horizontal web 46 and supporting webs 47, 48 and 49. Horizontal web 46 and supporting webs 47, 48 and 49, terminate at their inner end in a circular journal bearing 50 as may best be seen with reference to Figure 2.

An electric motor 31 is of the conventional type and is provided with an attachment plate 32 attached to housing 33. The attachment plate is secured to the rear of vertical web 41 as is best shown with reference to Figure 1 and is affixed securely thereto by bolts 51 being passed through apertures in web 41 and plate 32 as may best be seen with reference to Figures 1 and 2. These bolts are provided with nuts 52 as shown best with reference to Figure 2 and bolts 51 and nuts 52 are used to draw the surface of plate 32 in snug contact with the surface of web 41. It may be noted that throughout the embodiment of the machine described herein, Allenhead bolts are used, but it is, of course, to be understood that any other type of fastening may be used without departing from the spirit and the scope of this invention. The shaft 53 of the motor is provided with a worm 54 pinned, keyed or otherwise secured thereto in any well known and suitable manner.

Protruding from the front of web 41 is a threaded shaft 55. This threaded shaft is seated in an aperture in web 41 and snugly affixed in position by hexagonal nut 56. A spring 57 is positioned on the threaded shaft so that one end thereof engages the face of nut 56 and the other end thereof engages a washer 58. Washer 58 is in turn seated against knurled nut 59 which is threaded on the exterior end of shaft 55. Nut 59 has a forwardly extending portion of reduced diameter 60, and this portion of reduced diameter is smooth and free from knurling.

A combination guide and apron 62 is positioned at the front of the apparatus. Spot welded or otherwise securely affixed to the right end of this guide 62 is hexagonal sleeve 39. Hexagonal sleeve 39 seats on the top of projecting arm 44 and is affixed for rotation thereon by bolt and washer 38. The bolt extends downwardly and is threaded into inwardly protruding boss 28 as heretofore explained and as may best be seen with reference to Figure 1. Guide apron 62 comprises a top rearwardly extending flange 63, a downwardly depending portion 64 joined thereto, a frontwardly extending portion 65 and a second depending portion 66 joined thereto. Portion 66 is contiguous and forms a straight edge, portion 65 has a T-shaped opening 67 therein as may best be seen with reference to Figure 2 and portions 64 and 63 have a central rectangular opening 61 therein forming a continuation of opening 67. Flange 63 has a cut-out section 68 at the left end thereof which is adapted to receive the knurling of knurled nut 59, and is maintained in engagement therewith by the action of spring 37 which has one end connected to apron 62 and the other to web 41. This may best be seen with reference to Figure 2. The right edge of portion 63 and the upper edge of portion 64 is cut away to form cutout 69 as shown best with reference to Figure 1. An extending rectangular tab 70 which is bent slightly inward is provided on portion 64 at the left side of the central opening therein. At the other edge of the central opening in portions 63 and 64, opposite rectangular tab 70, there is provided a square tab 71 of section 64 which is bent rearwardly to form a right angle thereto. Tab 71 is provided with a slot 72 which serves to guide the feed pawl arm 73. Disposed on the front of the guide 62 are springs 74 provided with inwardly turned ends 75 and spring loops 76. These springs are secured at one end thereof to the face of depending portion 64 by bolts 77. These spring wires are identical and serve as guides for a band saw or other narrow saw blade when positioned as shown best in Figure 1. Thus, the springs are provided with an inwardly turned tip end 75, an extending portion 78, a loop 76 adjacent bolts and washers 77 and a small loop at the opposite end thereof adapted to be positioned around the bolts 77, to secure the springs thereto (not shown). The combination guide and apron 62 is supported at the right end thereof by the upper face of the arm 44 and at the left end thereof by the upwardly extending end of set screw 21.

Figure 25:
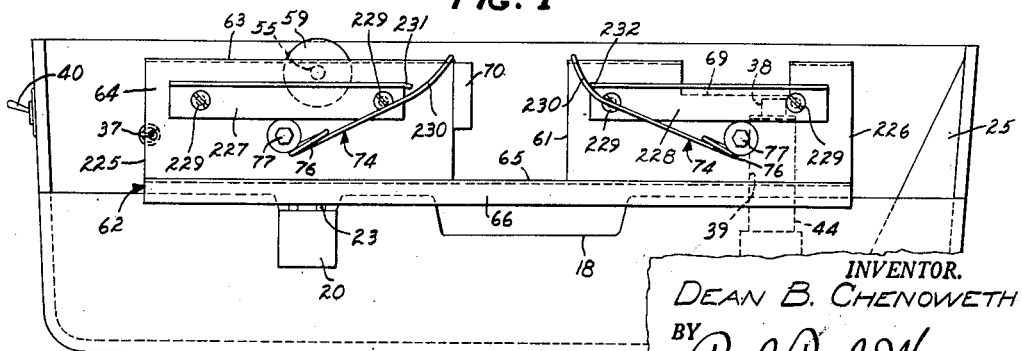
Figure 25 is a partial front elevational view similar to Figure 1 but showing a modified form of guide and apron.

A modified form of the guide and apron 62 is shown in Figure 25. In the modified form, the length dimension of flange 63 and depending portion 64 are extended a slight distance to the left with reference to Figure 24 terminating in edge 225. Likewise depending portion 64 is extended a slight distance to the right and terminates at edge 226. A pair of forwardly extending horizontal rests 227 and 228 are anchored to the front of apron 62 by screws 229 and serve to support a saw thereon during its passage through the setter. Springs 74 are lengthened and provided with a bend 230 so as to clear the ends 231 and 232 of rests 227 and 228.

Figure 3:
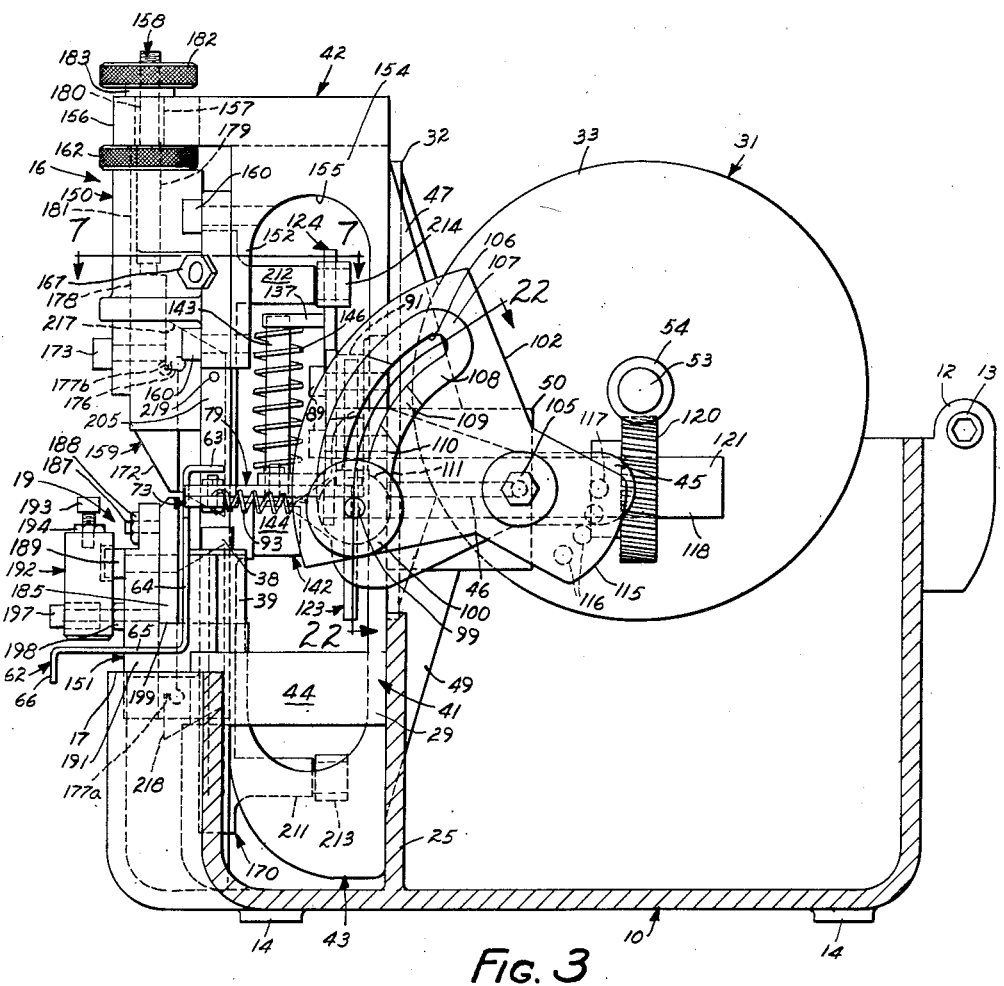
Figure 3 is a view taken along the lines 3—3 of Figure 2.
Figure 23:
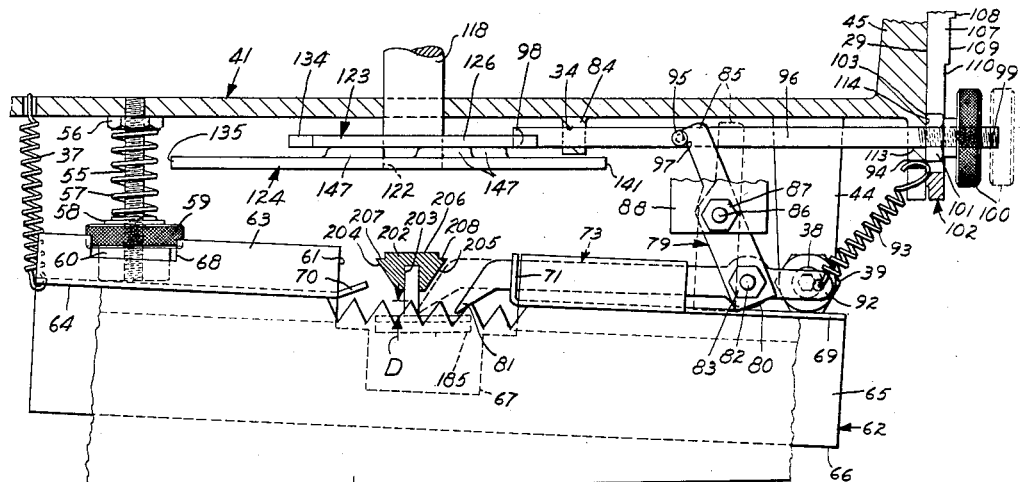
Figure 23 is a top plan view of the feed pawl apparatus partially in section and showing the feed pawl mechanism adjusted for feeding a coarse or large toothed saw.
Figure 24:
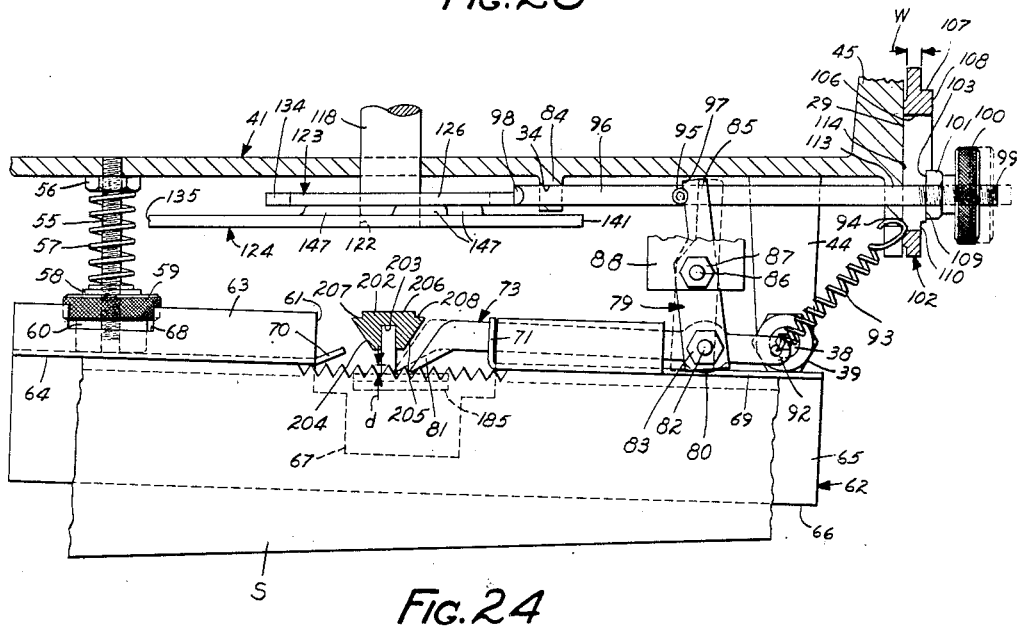
Figure 24 is a figure similar to Figure 23 but showing the feed pawl mechanism adapted for feeding a fine or small toothed saw.

The feed pawl mechanism for feeding the saw during the setting operation may best be seen with reference to Figures 3 and 23–24. The feed pawl mechanism comprises a feed pawl arm 73 having a bill-tip 81 at one end thereof and pivoted to the feed pawl pivot arm 79 at a point relatively close to the other end thereof. The feed pawl arm 73 has a protruding section 80 formed by two oppositely disposed semi-circular protuberances extending from the feed pawl arm 73. Said protruding section is apertured as is said feed pawl pivot arm 79 whereby the arm 73 is connected to arm 79 by means of pivot bolt 82 having a nut 83 thereon. In this instance the feed pawl arm 73 is pivoted to the underside of pivot arm 79 but of course this position may be changed without departing from the spirit and scope of this invention. Pivot lever 79 is of a shape shown best with reference to Figures 23 and 24 and is provided with an end 85 of reduced dimension. Pivot lever 79 is pivoted by means of bolt 86 having nut 87 thereto to an L-shaped supporting bracket 88. The vertical web 41 is provided with a machined surface just to the rear of the vertical flange of the L-shaped supporting bracket 88 (not shown). This machined surface is provided with a groove in the center thereof in which are disposed apertures for the reception of the threaded elements of Allenhead bolts 89. A washer 90 separates each one of the bolts 89 from the front surface of the bracket 88. Relatively large machined spacers 91 positioned on bolts 89 serve to space the bracket 88 from the machined face of the web 41 and in position thereon. The apertures 30 in the L-shaped bracket 88 through which the bolts 89 are inserted are rectangular in nature and slightly larger than the shank of the bolt, thus providing means by which the bracket 88 may be adjusted with reference to the web 41. This clearance or spacing will allow substantial adjustment of the vertical and horizontal positioning of the bracket and hence the feed pawl arm 73.

To end 92 of the fed pawl arm is attached a spring 93 which is attached through an aperture 94 at the large end of the fan-shaped plate 45. It may be noted at this time that spring 93 constantly tends to contract and thus to force bill-end 81 in an outward or saw-tooth engaging direction. The reduced end 85 of the pivot arm 79 is engaged by a small cap bolt 95 on feed pawl shaft 96. The cap bolt 95 comprises the usual hexagonal cap, a machined cylindrical surface and has only the end-portion thereof threaded. The threaded portion is thus threaded into an aperture in feed pawl shaft 96 and the cylindrical portion serves to contact edge 97 of reduced portion 85. The extreme left end of the shaft 96 is bevelled at the top and bottom thereof as is shown at 98. The opposite end of the shaft is threaded as at 99 for the reception of a knurled knob 100 and a nut 101 having a machined face 103 thereon. The feed pawl spacer bar 102 is of a fan-shaped configuration similar to fan-shaped plate 45 but of larger dimensions throughout as may thus be seen with reference to Figure 3. The spacer bar 102 is provided with an extending circular face 104 which is machined. A cap screw 105 is threaded through an aperture in the middle of face 104 and into a corresponding aperture in fan-shaped plate 45 for drawing face 104 into contact with face 112 on plate 45.

Figure 22:
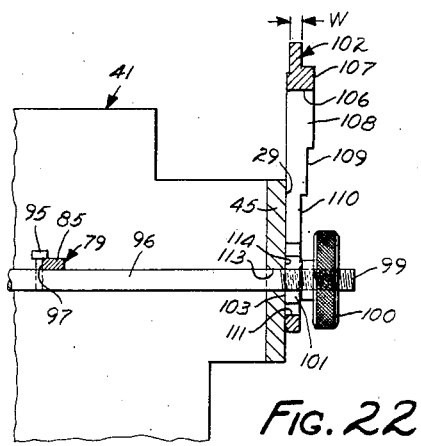
Figure 22 is a view taken along the lines 22—22 of Figure 3.

The spacer bar 102 as may best be seen with reference to Figure 22 and also Figure 3 has a semi-circular slide 106. Slide 106 has a machined collar 107 therearound as may best be seen with reference to Figure 3. Machined collar 107 comprises a plurality of steps, in this instance, four in number. Thus, may be seen step 108 which is positioned some distance away from the normal overall dimension W of the collar, step 109 which is positioned a lesser distance away from the normal dimension W of the spacer bar 102, step 110 which is merely a machined face on the surface of the normal dimension W of spacer bar 102 and step 111 which is merely a circular aperture in the spacer bar. Plate 45 has an aperture 113 therein through which shaft 96 is adapted to slide reciprocately. This provides a support for one end of shaft 96. The other end is supported for reciprocating movement in aperture 34 of projection 84. On the exterior surface of plate 45 and immediately surrounding the aperture 113 is a machined face 114, thus, adapted to be engaged by the machined face 103 of nut 101. Thus, it may be seen that through the action of spring 93, lever 73 and pivot lever 79 acting against cap screw 95, the shaft 96 will draw the machined face 103 of nut 101 against any one of the four different steps 108–111 depending upon the position of spacer bar 102. Disposed upon the butt end 115 of spacer bar 102 and on the interior surface thereof are semi-circular depressions 116 shown in Figure 3 which are adapted for cooperation with a detent 117. The detent 117 and the semi-circular depressions 116 constitute a detent mechanism which is not explained in specific detail since it is well known and understood throughout the industry. The semi-circular depressions 116 are spaced so as to correspond one for each of the steps 108–111 and thus retain the fan-shaped feed pawl spacer bar 102 in any one of four positions corresponding to one of the four steps.

Journaled for rotation on a suitable surface in journal bearing 50 is cam shaft 118. Cam shaft 118 is provided with a worm gear 120 which is keyed thereon adjacent end 121. The other end 122 of cam shaft 118 is inserted through an aperture at the center of the feed pawl cam 123 and also through an aperture in the actuating cam 124. Cams 123 and 124 are welded together and also welded to end 122 of shaft 118 as may best be seen with reference to Figures 8–19, and when welded to shaft 118 assume the position shown best with reference to said figures.

Feed pawl cam 123 is an integral unit comprised of two identical but reversed sections joined together along median line 127. Each one of the cam sections 125 and 126 is comprised of an off-center semi-circular arc swung in the case of cam 125 from 129 to 130 and in the case of cam 126, from 131 to 132. At the terminus of the arc, either 130 or 132, a straight line surface joins the terminus of the arc of one section with the initial point of the arc of the other section. Thus, cam section 125 comprises an arc swung from a point to the left of center 128 of shaft 118 and from initial point 129 to terminus 130. Straight line surface 134 then joins terminus 130 with the initial point 131 of the arc for cam 126. The arc of cam 126 is swung from a center which is slightly to the right of center 128 of shaft 118 and the arc for cam 126 terminates at 132 whereupon straight line surface 133 joins terminus 132 of cam surface 126 with initial point 129 of cam surface 125. Thus, it may be seen that each cam section comprises an arc and a straight line surface. The radius of the arcs for each cam section is exactly equal but in the case of cam surface 126, is swung from a point to the right of center 128 and in the case of cam 125 is swung from a point equally disposed to the left of center 128.

The actuating cam 124 is of a roughly semi-circular shape having an over-center terminating edge 139, a portion of extended radius 135 terminating in a substantially radial face 136 at the bottom of which is a forwardly extending tab 137 (with reference to Figures 8–19) which is disposed at right angles thereto and provided with an aperture 138. Adjacent tab 137 is a back-off protuberance 140 which is contiguous with a portion of lesser radius 141. It may be noted that along the edge 139 the dimension E is greater than the dimension R, thus further illustrating the portion of extended radius 135 and the portion of reduced radius 141.

A spring pivot arm 142 comprises a cylindrical shaft 143 and a rectangular terminal block 144 provided with aperture 145 at the center thereof. Shaft 143 is located for reciprocating movement through the aperture 138 of outwardly turned tab 137. A power spring 146 has one end engaging the inner surface of tab 157 and the outer end engaging the bottom surface of rectangular head 144.

The actuating cam 124 is joined to the extremity of end 122 of shaft 118 and feed pawl cam 123 is disposed adjacent the inner surface thereof as may best be seen with reference to Figures 8–19. Actuating cam 124 is provided with stamped depressions 147. Depressions 147 are stamped inwardly with reference to Figures 8–19 and thus provide protuberances between cams 123 and 124. Cams 123 and 124 are welded together by means of these inwardly stamped depressions 147 so as to provide a unitary structure. The weld circles are shown by the dotted lines 148 in Figures 8–19.

The upper vice jaw assembly 16 comprises upper vice jaw frame 42 and upper gib support 150. The lower vice jaw assembly 19 comprises a lower vice jaw frame 43 and a lower gib support 151. The upper vice jaw frame is integral with vertical web 41 and disposed at the top center thereof as may best be seen with reference to Figures 1 and 2. It is provided with a pair of cantilever arms 152 and 153 as shown best with reference to Figure 7. These cantilever arms 152 and 153 are joined to web 41 by traverse section 154 which is provided with an upwardly concave bottom 155 thereon. Frame 42 is provided with a forwardly extending nose 156 which is planar at the top and bottom thereof and which has an oversize aperture 157 through which is inserted the threaded shaft 158 of the upper vice jaw 159. Attached to the front surface of cantilever arms 152 and 153 by bolts 160 is the upper gib support 150. Upper gib support 150 has a rectangular horizontal aperture 161, extending from the front to the back thereof as is shown best with reference to Figures 5 and 6. Upper gib support 150 is of channel configuration so as to provide a forwardly extending convex shell having a rearwardly extending concave channel therein. Upper vice jaw 159 is adapted for vertical adjustment in the channel of upper gib support 150 and the forward surface 171 thereof slides on channel surface 181 of gib support 150. Bolt 173 firmly positions the jaw 159 in this position so that surfaces 171 and 181 are in snug contact as is explained hereinafter. Disposed between the top of the upper gib support 150 and the bottom of the nose 156 is an upper vice jaw adjustment wheel 162.

The cross-section of the upper gib support may best be seen with reference to Figure 7 wherein are shown cantilever arms 152 and 153 secured to the upper gib support 150 by bolts 160 not shown in this sectional view. Gibs 163 and 164 are positioned on the inner surface of support 150 and are adapted for inward or outward adjustment by adjustment screws 165 and 166 which are locked in juxtaposition by nuts 167 and 168. The configuration of the inner channel of the gib support 150 is also best seen with reference to Figure 7. Shown also with reference to this figure is the hammer slide 170 which is mounted therein for vertical travel.

The upper vice jaw 159 comprises a bevelled anvil 172 having an aperture therethrough in which is inserted a bolt 173 which is adapted for vertical movement in aperture 161 and thus serves to abut the edges of rectangular aperture 161 at 174 and 175 to serve as a limit stop for the upward and downward adjustment of vice jaw 159. Jaw 159 is also provided with a stop 176 which serves to engage a cooperating integral projection 177b on hammer 217. The upper vice jaw 159 is also provided with a portion of reduced dimension and substantially square configuration 178. Connected thereto at the upper end thereof is the larger threaded diameter 179 of shaft 158, shaft 158 also having a portion of reduced diameter 180. Adjustment wheel 162 is threaded on the threaded portion 179 while lock wheel 182 provided with a depending boss 183 is threaded on reduced portion 180.

The lower gib support 151 is similar in operation with reference to the upper gib support 150 and provides gib surfaces substantially identical with 163 and 164 as explained with reference to the upper gib support 150 as shown in Figure 7. The lower gib support 151 also provides a channel in which the reciprocating hammer slide 170 is adapted for vertical movement. Provided on the surface of lower gib support 151 is an anvil supporting bolt 189 which is threaded for insertion in aperture 184 in an anvil block 185. Anvil 185 is a rectangular block of hardened steel having a planar face 186 thereon and serves also as a fixed lower vice jaw. As may be seen best with reference to Figures 20–21 face 186 is of equal width to face 159a so as to prevent unequal stress of setting as hammer slide 170 reciprocates. Thus an identical width of faces 159a and 186 provides that the impact on the saw tooth of an upswing of slide 170 will be equal with the impact on the saw tooth given by a down swing of slide 170. A pair of adjustment screws 187 have their inner ends adapted to engage the surface of anvil block 185 near the top thereof for slight horizontal adjustment of the same in conjunction with bolt 197. Adjustment screws 187 are adapted to be locked in adjusted position by means of hexagonal nuts 188 thereon. It may be noted with reference to Figure 1 that the anvil block 185 is situated a short distance to the right of left edge 190 of the lower gib support and extends exteriorly to the right of the right edge 191 of the lower gib support.

Positioned on the front of lower gib support 151 is a saw support or stabilizer 192. Saw support 192 comprises a general cylindrical body having an aperture 193′ therein whereupon the support may be disposed over the head of anvil bolt 189 which serves as an index therefor. Into the top of support 192 is placed an adjustable bolt 193 having a lock nut 194 thereon. Provided adjacent the bottom surface of support 192 is a horizontal cylindrical well 195. Disposed within and engaging the bottom surface of well 195 is a spring 196 adapted to engage the head of bolt 197. A spacing nut 198 is provided between support 192 and the front surface of lower gib support 151 as may be seen with reference to Figures 5 and 6. Bolt 197 serves to mount saw support 192 and to position block 185 in cooperation with screws 187 as may be seen best in Figures 3–6. Nut 198 also serves to lock bolt 197 in place against anvil block 185.

The hammer slide generally designated 170 comprises a central boss 200 and a channel member 202 of the cross-section best shown with reference to Figures 23 and 24 having a central vertically extending channel 203 therein. As may be seen with reference to Figures 23 and 24 channel member 202 is provided with bevelled surfaces 204 and 205 which extend vertically upwardly and downwardly along the exterior edges thereof and a central web 206, thus providing grooves 207 and 208. Grooves 207 and 208 are adapted to engage the inner edges of cantilever arms 152 and 153 of upper vice jaw frame 42 and like arms of lower vice jaw frame 43 whereby central web 206 will project therebetween and thus cooperating surfaces between the gib supports 150 and 151 and the vice jaw frames 42 and 43 and the hammer slide 170 are provided whereby the hammer will travel vertically in a predetermined path as may best be seen in Figures 2–4 and 7. Keyed into the channel 203 as may best be seen with reference to Figure 4 are hammers 217 and 218, keyed through the hammer slide 170 at 219 for hammer 217 and at 220 for hammer 218. The hammers 217 and 218 are substantially identical each one being provided with a bevelled face 221 and a limit stop 177a or 177b at the end thereof. The bevelled face 221 provides the hammer surface which is adapted to engage the saw teeth for the setting thereof. The stops 177a and 177b serve to limit the upward and the downward travel of the hammer slide. Thus, stop 177a is adapted for engagement with the underside 199 of anvil block 185 and will thus always limit the upward travel of the hammer slide. Stop 177b is adapted for engagement with stop 176 of the upper vice jaw and thus will always limit the downward travel of the hammer slide. However, it may be noted at this point that while stop 177a will always stop on the under surface 199 of the anvil block 185 and thus in a fixed position that the downward limit of travel of the hammer slide 170 may be varied within limits provided by the extent of the aperture 161 as the upper vice jaw 159 is adjusted upwardly and downwardly as will be more fully explained hereinafter.

The central boss 200 has an aperture 209 therethrough into which is threaded a cap bolt 210 which is threaded through aperture 145 of rectangular block 144 on shaft 143 of arm 142. Two inwardly projecting arms 211 and 212 extend inwardly from hammer slide 170 and are provided with rollers 213 and 214 at the inner ends thereof. Rollers 213 and 214 are affixed thereto in any well known suitable manner and are adapted to be engaged by the surface of actuating cam 124 to operate said shaft.

In the operation of the present apparatus, it may be noted that the feed pawl mechanism is adapted to feed the saw from the right to the left therethrough. When it is desired to insert a saw in the setter for setting, hexagonal nut 23 of adjustment screw 21 is loosened and then the screw is adjusted upwardly or downwardly as may best be seen with reference to Figure 1 until the guide plate 62 is substantially level. This leveling of guide plate 62, carrying with it the adjustment of tab 71 of section 64 which is provided with slot 72 which serves to guide the feed pawl 73 therein consequently determines the vertical position of the bill end 81 of feed pawl arm 73 and thus serves to provide a slight vertical adjustment when necessary for use with thick or thin saws so that end 81 will squarely engage the saw teeth. Usually, however, once adjustment screw 21 is adjusted to level the guide plate 62, the nut 23 may then be tightened and the adjustment screw 21 may be maintained in this position for most operations.

The knurled nut 59 will then be rotated for determining the horizontal adjustment of the guide plate 62. Thus, as shown best with reference to Figures 23 and 24, if a saw with large teeth is to be set, the guide plate 62 will be positioned substantially closer to the machine so that the larger teeth will overhang the anvil block substantially to the depth D thereof as is shown best with reference to Figure 23. If a saw of substantially smaller teeth is being set, as is shown in Figure 24, the guide 62 will be adjusted by means of knurled nut 59, pivoting about bolt 38 so as to again cause the teeth of the small saw to extend over the anvil block substantially to the depth D of the teeth. If a band saw or jigsaw of small width is being set, the ends 75 of springs 74 will be pulled outward from their contact with the upper flange 63 of apron 62 as is shown in Figure 1, and the saw will be placed thereunder, thus being held snugly against the guide apron 62 by means of these springs 74. However, if as shown in Figures 23 and 24, a conventional carpenter's saw is being set, the ends 75 are pulled downwardly with reference to Figure 1 and out of contact from flange 63 of apron 62 and hence out of the path of travel of the saw blade and the saw is instead supported by bolt 193 as may best be seen with reference to Figures 4, 5 and 6.

Figure 5:
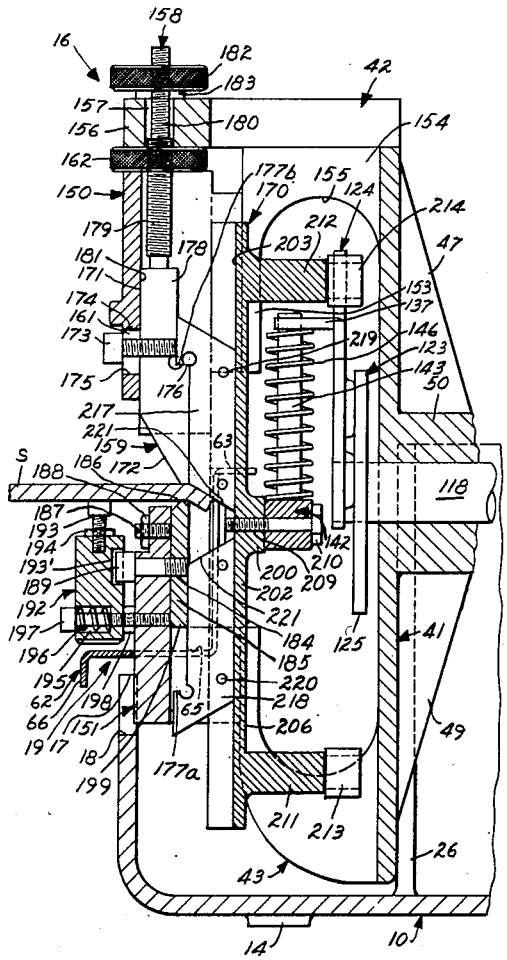
Figure 5 is a sectional view of the hammer assembly showing one hammer engaging the top side of a saw for setting in a downward direction.
Figure 6:
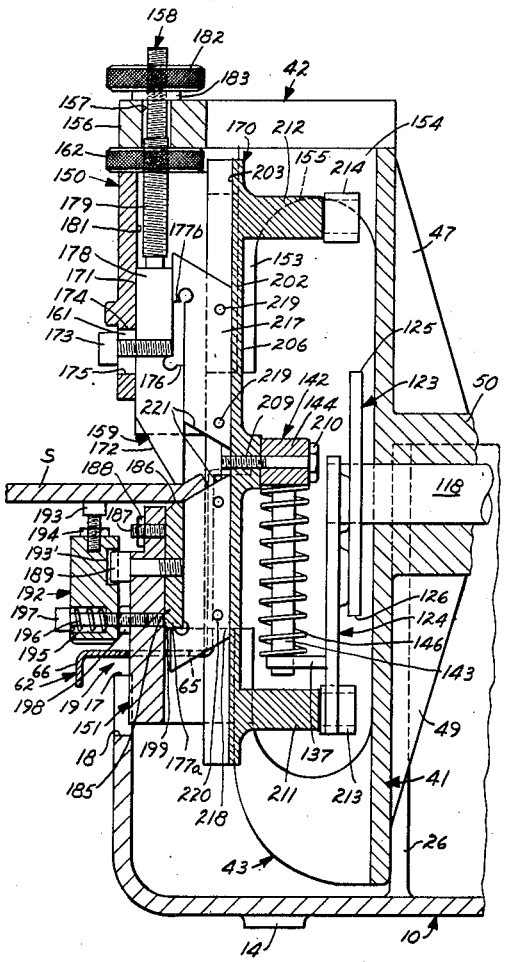
Figure 6 is a view similiar to Figure 5 but showing the hammer engaging the under side of an alternate tooth for setting in an upward direction.
Figure 8:
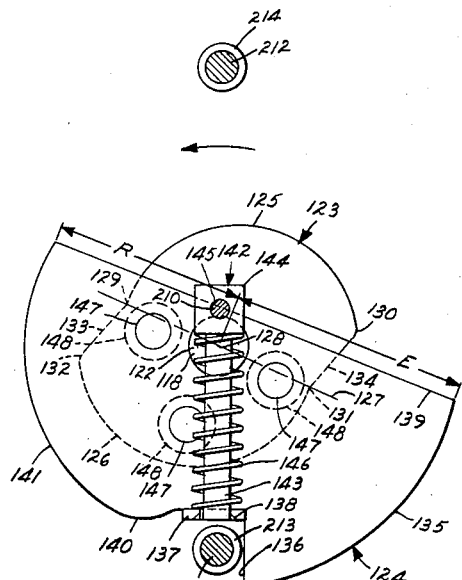
Figures 8–19 are a series of partially schematic front views of the cam and spring means for actuating the reciprocating hammers and for feeding the saw teeth in conjunction therewith and illustrating the positions of the hammers by the positions of the respective hammer rollers.

The bolt 193 is adjustable as explained before and nut 194 is loosened and then bolt 193 is raised or lowered as may best be seen with reference to Figures 4, 5 and 6, until the saw S is supported levelly by the top of bolt 193 and the top 186 of anvil block 185. Nut 194 is then tightened to secure bolt 193 in this position. As explained before, saw support 192 is provided with a spring 196 engaging the bottom of well 195 and the bottom of cap 197. This provision allows support 192 to be pulled outwardly with reference to Figures 4–6 and rotated either to the left or to the right so that it will hang downwardly from bolt 197 and thus allow the handle of the saw to pass by without contacting the same whenever this is necessary.

In order to clamp the saw between the top 186 of anvil block 185 and the upper vice jaw 159, the knurled locking nut 182 is loosened, thus allowing the manipulation of the knurled adjustment wheel 162 to raise and lower the upper vice jaw 159 so that it may contact the surface of a thick saw as shown in Figure 20 or the surface of a thin saw as shown in Figure 21. The upper vice jaw 159 is raised, the saw blade inserted as shown in Figures 20 and 21 and the upper vice jaw is then lowered by means of adjusting wheel 162 until it snugly engages the surface of the saw as shown in said figures. Lock wheel 182 is then turned until the upper vice jaw 159 is locked in this position.

This adjustment of the upper vice jaw 159 also determines the downward limit of travel of the hammer slide since upward and downward adjustment of vice 159 also entails upward and downward adjustment of a stop 176 which serves to engage the cooperating projection 177a which is located on hammer 217 which is in turn keyed to hammer slide 170. This feature of the invention provides that the hammer 217 will stop at the limit of its downward travel in the position shown in Figures 20 and 21 or with the left end of face 221 level with the end 159a of upper vice jaw 159, and thus the amount of swage or bend given to alternate teeth of the saw will be the same in either direction whether the saw tooth is struck by hammer 217 or by hammer 218 since the hammer 218 always stops in the position shown in Figure 6 by virtue of stop 177a engaging the underside 199 of fixed anvil block 185. No matter whether a tooth is being bent downward by hammer 217 or is being bent upward by hammer 218 the amount of bend will be the same for all the teeth no matter whether the saw is thick or thin.

Next the feed pawl mechanism is adjusted to feed the saw the requisite amount. The feed pawl bill 81 as shown best with reference to Figures 23 and 24 slides in response to the reciprocation of shaft 96 by feed pawl cam 123 from the full line position of Figures 23 and 24 to the dotted line position thereof. If, as may be seen with reference to Figure 23, a saw having relatively large teeth which are consequently spaced further apart than a saw having relatively small teeth, is to be set, the feed pawl bill 81 must travel from right to left a greater distance than with respect to Figure 24 in which a saw having small teeth set relatively close together is being fed through the setter. The feed pawl spacer bar 102 having provision for steps 108–111 will determine the amount of distance which the saw S is to be fed on every one-half revolution of the feed pawl cam. Thus, the saw will be fed twice for every complete revolution of the feed pawl cam as will be more fully explained hereinafter.

The width of the various steps 108–111 is initially determined so that the positioning of the face 101 of nut 100 will determine the amount of feed by the feed pawl bill 81 and thus will correctly determine the proper amount of feed for the saw being set. In the instant case, the step 108 was predetermined to feed saws having from 12–18 teeth per inch; step 109, saws from 8–11 teeth per inch; step 110, saws having 6–8 teeth per inch, and when the face 101 of nut 100 engaged machined face 114 thus providing step 111, the saw was adapted to feed saws having 4–5½ teeth per inch. The position of the knurled knob 100 and the nut 101 is determined initially at the factory for any one of the steps 108–111 and the width or distance of the remaining steps away from the normal width W of the spacer bar 102 is determined initially at the factory. However, in the case of wear or otherwise maladjustment of the feed pawl mechanism, knurled knob 100 and nut 101 are provided for adjustment. The detent 117 and the semi-circular depressions 116 constitute a detent mechanism to maintain the spacer bar 102 in any one of the four positions corresponding to one of the four steps 108–111 as is well known in the industry.

Thus, it may be seen that the shaft 96 reciprocates in response to the rotation of feed pawl cam 123 causing cap bolt 95 to engage reduced end 85 of feed pawl pivot arm 79 and thus to reciprocate the feed pawl arm 73 having bill end 81 thereon. A spring 93 is provided to maintain tension on end 92 of arm 73 and thus when the shaft 96 is reciprocated to the right with reference to Figures 23 and 24, bill end 81 will engage the teeth of the saw and push the saw forward as the bill end 81 moves from the full to the dotted line position of those figures. However, once the cam surface has released end 98 of shaft 96 the spring 93 will operate to pull the arm 73 from the dotted to the full line position of Figures 23–24 and the bill 81 will slide over the teeth of the saw without causing movement thereof.

The motor serves to operate the cam shaft 118. Feed pawl cam 123 and actuating cam 124, since they are integrally bound together, serve to operate in unison in response thereto to alternately feed and set the saw. The hammer slide 170 reciprocates in the upper and lower gib supports 150 and 151 having its limit of upward and downward motion determined as explained before, in response to the operation of the actuating cam shaft. With reference to Figures 4 and 5 particularly, Figure 5 shows the hammer slide 170 in the down-setting position and the hammer 217 engaging the saw S. Figure 6 shows the hammer slide 170 in the upsetting position and the hammer 218 engaging the under side of the saw S. Figure 5 corresponds to the cam diagram shown in Figure 14, and Figure 6 corresponds to the cam diagram shown in Figure 8. Thus, in Figure 5 there is shown the stop 177b of hammer 217 engaging stop 176 of upper vice jaw 159. In Figure 6 is shown stop 177a engaging the under side 199 of anvil block 185. Since the hammers 217 and 218 are pinned to the hammer slide 170 the reciprocating movement is also limited by stops 177a and b.

Referring now to Figures 8–19, there is shown a series of twelve views, partially diagrammatic, showing one complete revolution of a feed pawl cam 123 and the actuating cam 124, the cocking and releasing of the spring 146 and the operation of the hammer slide 170 in response thereto as well as the operation of the feed pawl mechanism. It may be noted with reference to these drawings that the hammer slide is illustrated only by the rollers 214 and 213. These rollers are integrally connected to slide 170 and constantly maintained with a fixed distance therebetween; hence the positioning of the rollers in these figures will indicate the position of the hammer slide and consequently the positioning of the hammers 217 and 218. As mentioned previously, Figure 8 corresponds to Figure 6 in which the hammer slide 170 is in the up-fired position and the hammer 218 is bending a tooth of saw S over the upper vice jaw 159 as may be seen in Figure 6. In this position spring 146 has been fired and released, shaft 142 has reciprocated upward through aperture 138 and hammer 218 has been carried upward also and there is very little or no tension on block 144. The setter has just fired up. The end 98 of feed pawl shaft 96 is at a point slightly above the initial point 131 of arc section 126 and thus the feed pawl mechanism is in the full line position shown in Figures 23 and 24.

Figure 9:
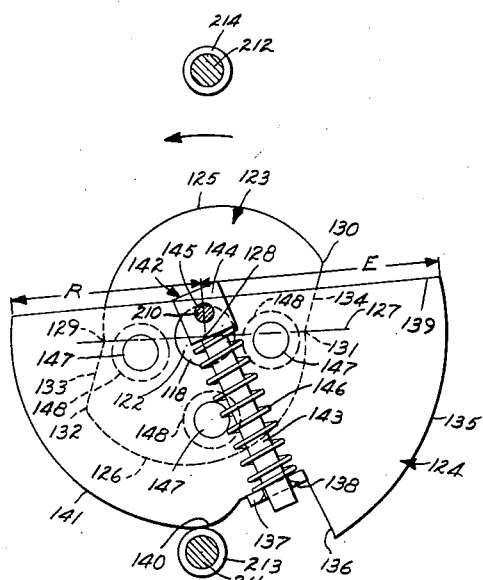

In Figure 9 the cam assembly (which rotates always in the direction of the arrows, although it is to be understood that the cam assembly might be still designed as to rotate in a reverse direction without departing from the spirit and scope of this invention) is rotated slightly so that roller 213 has been engaged by protuberance 140 of actuating cam 124. This causes hammer slide 170 to back off or move in a downward direction as may be seen with reference to the change in position of roller 213 from Figure 8 to Figure 9. This causes hammer 218 to move slightly in a downward direction with respect to Figure 6 and thus be released from contact with the under side of the saw S. This is known as the back-off position. In this back-off position the V formed by the surfaces 221 of hammers 217 and 218 is approximately centered around the space between the surface 186 of anvil block 185 and the under side 159a of upper vice jaw 159 so that the saw may be readily fed through the V provided between the surfaces 221. In this back-off position the feed pawl cam has barely, if at all, contacted end 98 of shaft 96 and consequently the feed pawl mechanism has not yet begun to feed. It may be noted that in the back-off position shown in Figure 9 the spring 146 is slightly compressed as may be seen by the amount of shaft 143 which protrudes through aperture 138.

Figure 10:
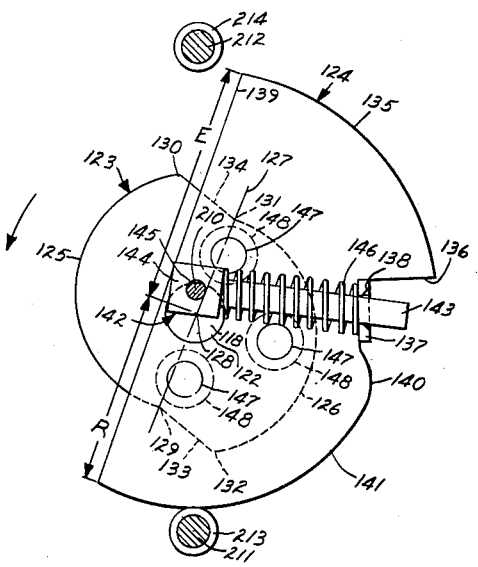

As the cam assembly rotates from the position shown in Figure 9 to the position shown in Figure 10, the spring 143 is increasingly compressed as may be seen with reference to Figure 10 and surface 126 of feed pawl cam has engaged end 98 of shaft 96 and thus bill end 81 has begun to feed the saw through the setter.

Figure 11:
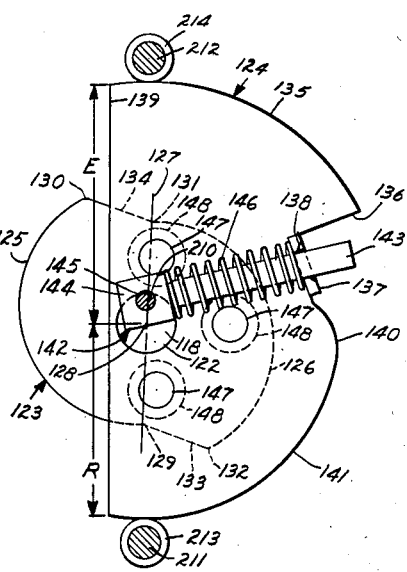

In the position shown in Figure 11 it will be noted that both rollers 213 and 214 are engaged by actuating cam 124 as the spring 146 has passed through a horizontal position and is now inclined slightly downwardly. However, the engagement of roller 214 by the surface of cam 124 prevents any downward movement of the hammer slide 170 in response to the downward component of the force exerted by spring 146. The feed pawl mechanism has been further actuated so that the saw has been moved a further distance by virtue of the fact that section 126 of cam 123 is of increasing radius about center 128 of shaft 118.

Figure 12:
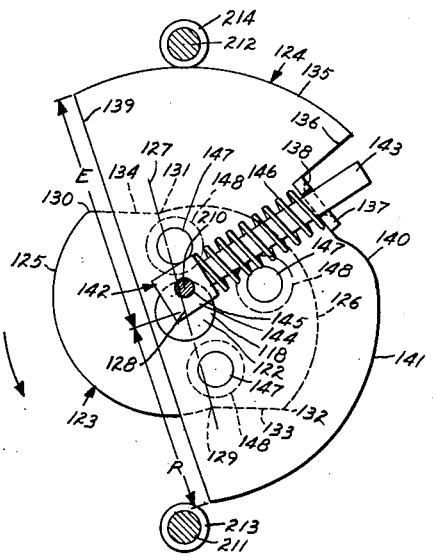

In the position shown in Figure 12, roller 213 has been completely released from the surface of the cam 124. However, the roller 214 is not allowed to move in a downward direction in response to the downward component of spring 146 since it is maintained in position by the engagement of the upper surface of cam 124 therewith.

Figure 13:
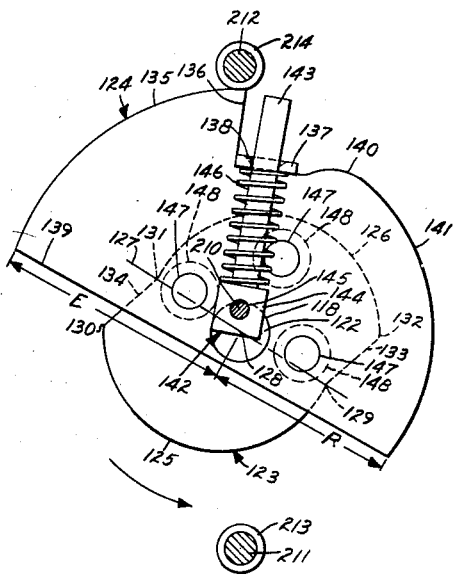

In Figure 13 the hammer slide is shown in fully cocked or ready to fire downward position. It may be noted in reference to this figure that the end 98 of shaft 96 will be engaging the terminus 132 of arc portion 126 and thus be at the position of utmost feeding of the saw. It may be noted that end 98 will now be in a position so that as the camming mechanism is further rotated, end 98 will be quickly released along the inwardly inclined straight line 133 and thus the action of spring 93 will quickly remove bill 81 from any interference with the hammer slide 170 as it reciprocates in response to the action of roller 214 rolling off the edge of surface 135 of cam 124 and hence quickly releasing roller 214 from cam 124 and allowing the hammer slide 170 to fire or reciprocate downward causing hammer 217 to deliver a sharp blow to the upper side of a saw tooth.

Figure 14:
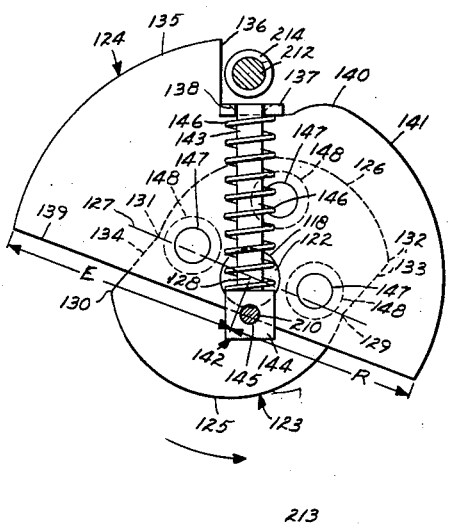

Figure 14 corresponds to Figure 5 of the drawings and shows the upper slide 170 in just fired down position. In this position the spring 93 has quickly reciprocated shaft 96 to preclude any possibility that bill end 81 will be an interference to the action of the hammer slide. As roller 214 rolls off surface 135 of cam 124, the action of the powerful spring 146 quickly and sharply reciprocates the hammer slide in a downward direction and this strikes a snappy impact blow to the upper side of the saw blade as may be seen with reference to Figure 5.

Figure 15:
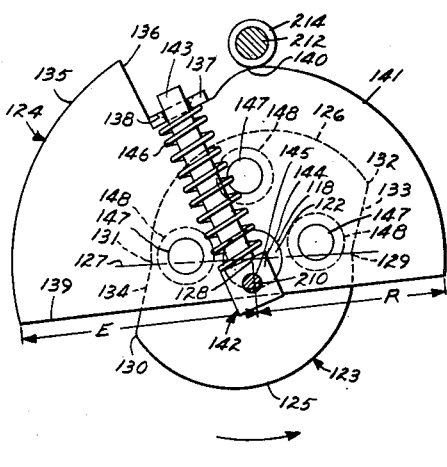

Figure 15 is a view which corresponds to Figure 9 except that it shows the camming mechanism in a backed-off position in an upward instead of a downward direction.

Figure 16:
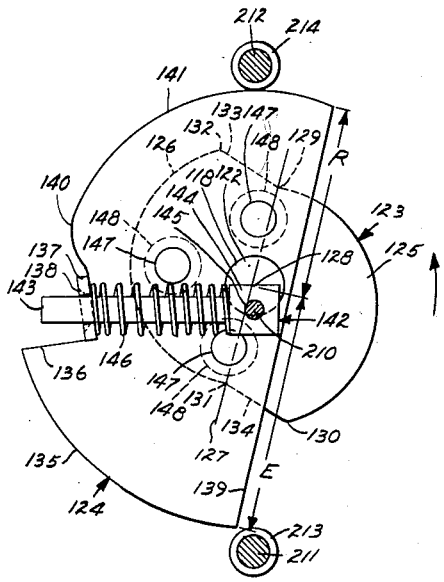

Figure 16 is a view similar to Figure 10 but also showing the compression of spring 146 in preparation for filling an upward blow.

Figure 17:
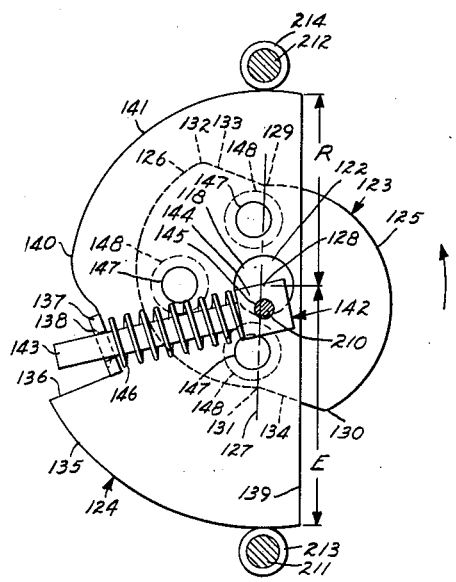

Figure 17 corresponds to Figure 11 but shows the surface of cam 124 engaging both rollers 213 and 214 preparatory to an upward firing of the hammer slide 170.

Figure 18:
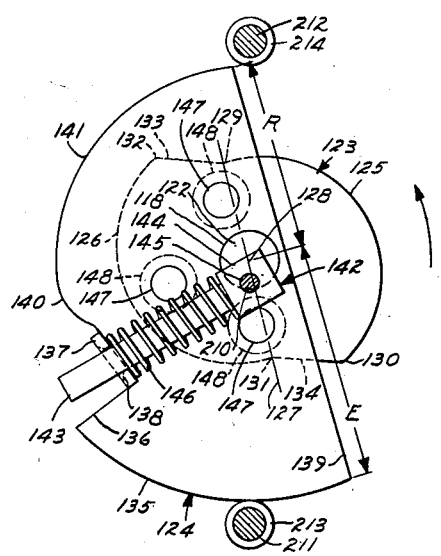

Figure 18 corresponds to Figure 12 and shows the hammer maintained in a downward position by action of the surface 135 of cam 124 on roller 213 even though the upward component of the force of spring 146 would tend to reciprocate the slide in an upward direction.

Figure 19:
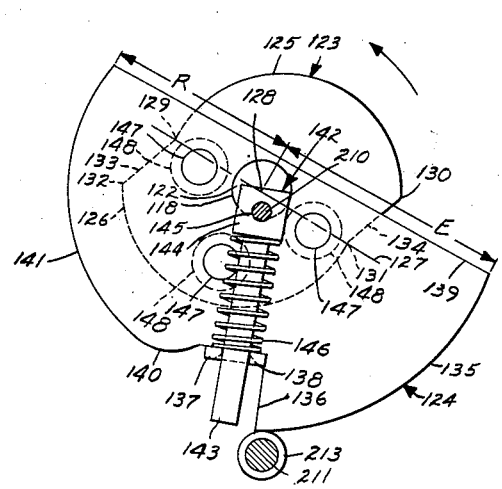

Figure 19 corresponds to Figure 13 with the exception that the setter is in the upward cocked position and the hammer slide is set to reciprocate in an upward direction whereupon hammer 218 will deliver a blow to the under side of the saw and thus set one of the teeth in the upward direction. The next position of the camming apparatus after the position shown in Figure 19 will be the position shown in Figure 8.

Thus, there has been illustrated a complete revolution for the camming apparatus comprising the actuating cam 124 and the feed pawl cam 123. It will be readily understood from a consideration of these Figures 8-19 that for each revolution of the camming apparatus the saw is fed twice by virtue of the arc portions 126 and 125 and the spring 146 is cocked and released to deliver a downward blow of the hammer slide 170 and is then cocked and released to deliver an upward blow of the hammer slide 170. Thus, for each revolution of the camming apparatus one tooth of the saw will be fed and set in an upward direction and one tooth of the saw will be fed and set in a downward direction.

As many widely different embodiments of this invention may be made without departing from the spirit and scope thereof, it is to be understood that I do not limit myself to the specific embodiment disclosed herein.

What I claim is:

1. In a saw setter comprising in combination a vice for gripping a saw therein for the setting thereof, a pair of reciprocating hammers affixed together in spaced relation for setting successive teeth of a saw in opposite directions, and means for reciprocating said hammers, the improvement comprising means for feeding said teeth comprising a saw tooth engaging lever adapted for feeding said saw through said vice, a reciprocating shaft actuating said saw tooth engaging lever, and a spacer bar for determining the amount of reciprocation of said shaft, said spacer bar comprising a plurality of steps, each one of said steps being adapted for limiting the reciprocation of said shaft to a predetermined distance.

2. An improved saw setter comprising in combination a stationary member and an adjustable member for gripping a saw therein for the setting thereof, a pair of reciprocating hammers affixed together in spaced relation for setting successive teeth of a saw in opposite directions, means for reciprocating said hammers, and means operable in response to the reciprocation of said hammers for feeding successive teeth of said saw into position to be set by one of said hammers, a limit stop carried by each of said reciprocating hammers, a fixed limit stop carried by said stationary member and an adjustable limit stop carried by said adjustable member, said fixed limit stops on said hammers cooperating with said fixed and adjustable limit stops for determining the limit of reciprocation of said hammers.

3. An improved saw setter comprising in combination a vice for gripping a saw therein for the setting thereof with the teeth of said saw extending therefrom, a pair of reciprocating hammers affixed together in spaced relation for bending successive teeth of a saw in opposite directions over one of said vice jaws, cam means for reciprocating said hammers, and means operable in response to the reciprocation of said hammers for feeding successive teeth of said saw into position to be bent by one of said hammers, a limit stop carried by each of said reciprocating hammers, a fixed limit stop carried by one jaw of said vice and an adjustable limit stop carried by the other jaw of said vice, said fixed limit stop on one of said hammers cooperable with said fixed limit stop on said vice jaw and the stop on the other of said hammers cooperable with said adjustable limit stop on said vice for determining the limit of reciprocation of said hammers.

4. An improved saw setter comprising in combination a vice having at least one adjustable jaw for gripping the saw therein for the setting thereof, a pair of reciprocating hammers affixed together in spaced relation for alternate reciprocation to set successive teeth of the saw in opposite directions, means for reciprocating said hammers, means operable in response to the reciprocation of said hammers for feeding successive teeth of said saw into position to be set by one of said hammers, said means for reciprocating said hammers comprising a member carrying said hammers, resilient means connecting said member to a cam means for the operation thereof, and power means operating said cam means whereby the operation of said cam means will compress and release said resilient means for the reciprocation of said member carrying said hammers.

5. An improved saw setter comprising in combination a vice having at least one adjustable jaw for gripping the saw therein for the setting thereof, a pair of reciprocating hammers affixed together in spaced relation for setting successive teeth of the saw in opposite directions, means for reciprocating said hammers, means operable in response to the reciprocation of said hammers for feeding successive teeth of said saw into position to be set by one of said hammers, said means for reciprocating said hammers comprising a slide member carrying said hammers, a power spring connecting the center of said slide member to a cam means for the operation thereof, power means operating said cam means whereby the operation of said cam means will compress and release said power spring for the reciprocation of said slide member carrying said hammers.

6. The apparatus of claim 5 further characterized by second cam means operable in synchronism with said first cam means for the actuation of said feed means.

7. The apparatus of claim 6 further characterized in that said feed means comprises a saw tooth engaging member adapted for feeding said saw through said vice, a reciprocating shaft actuating said saw tooth engaging member, and a spacer bar for determining the amount of reciprocation of said shaft, said spacer bar comprising a plurality of steps and each one of said steps being adapted for limiting the reciprocation of said shaft to a predetermined distance.

8. In a saw setter comprising in combination a vice for gripping the saw therein for the setting thereof, reciprocating hammers affixed together in spaced relation to a reciprocating element for setting successive teeth of a saw in opposite directions, the improvement comprising a cam mechanism for operating said reciprocating element, said cam mechanism comprising a cam connected to said reciprocating element by a resilient member and means on said reciprocating element cooperable with a surface on said cam whereby said resilient element may be compressed and released to reciprocate said reciprocating member as said cam is rotated through 180 degrees.

9. An improved saw setter comprising in combination a vice for gripping a saw therein for the setting thereof, a pair of reciprocating hammers affixed together in spaced relation for setting successive teeth of a saw in opposite directions, said hammers being affixed to a reciprocating hammer slide, a single power spring connecting said hammer slide to a rotating cam, feed means for feeding successive teeth of said saw through said vice for the setting thereof, said cam having a hammer slide actuating member and a feed means actuating member, and said feed means actuating member operating in synchronism with said hammer slide actuating member whereby a saw tooth will be fed through the vice after each reciprocation and said hammer slide actuating cam will rotate to cause said power spring to compress and release to reciprocate said hammer slide for every 180 degrees of revolution of said cam.

10. An improved saw setter comprising in combination a vice, one jaw of said vice comprising a fixed element, the other jaw of said vice comprising an adjustable element, means for adjusting said adjustable element and means for locking the same in fixed adjusted position, said fixed and said adjustable vice elements each comprising a ledge over which a saw tooth may be bent, a stop secured on said fixed vice element and a stop secured on said adjustable vice element, a reciprocating hammer slide carrying a pair of hammers in fixed spaced relation thereon, said reciprocating hammer slide being positioned for reciprocating movement immediately adjacent and in the plane of adjustment of said adjustable vice element, a stop on each of said hammers, the stop on one of said hammers adapted for engagement with the stop on said fixed vice element and the stop on the other of said hammers adapted for engagement with the stop on said adjustable vice element whereby the limit of reciprocation of said hammers shall be determined by said engaging stops and whereby one hammer will always be limited in a predetermined position and the other hammer will be limited in an adjustable position, a pair of terminal projections located one on each end of said hammer slide, and a central pivot thereon, a coil spring connecting said central pivot with the periphery of a first eccentric cam, whereby rotation of said cam through 180 degrees will cause the reciprocation of said hammer slide in one direction, and said terminal elements on the ends of said hammer slide cooperating with the surface of said eccentric cam to allow said coil spring to be compressed and then sharply released to cause a snap action reciprocation of said hammer slide causing one of said hammers to deliver a blow to a tooth of a saw held in said vice.

11. An improved saw setter comprising in combination a vice, one jaw of said vice comprising a fixed element, the other jaw of said vice comprising an adjustable element, means for adjusting said vice element and means for locking the same in fixed adjusted position, said fixed and said adjustable vice elements each comprising a ledge over which a saw tooth may be bent, a stop secured on said fixed vice element and a stop secured on said adjustable vice element, a reciprocating hammer slide carrying a pair of hammers in fixed spaced relation thereon, said reciprocating hammer slide being positioned for reciprocating movement immediately adjacent and in the plane of adjustment of said adjustable vice element, a stop on each of said hammers, the stop on one of said hammers adapted for engagement with the stop on said fixed vice element and the stop on the other of said hammers adapted for engagement with the stop on said adjustable vice element whereby the limit of reciprocation of said hammers shall be determined by said engaging stops and whereby one hammer will always be limited in a predetermined position and the other hammer will be limited in an adjustable position, a pair of terminal projections located one on each end of said hammer slide, and a central pivot thereon, a coil spring connecting said central pivot with the periphery of a first eccentric cam, whereby rotation of said cam through 180 degrees will cause the reciprocation of said hammer slide in one direction, said terminal elements on the ends of said hammer slide cooperating with the surface of said eccentric cam to allow said coil spring to be compressed and then sharply released to cause a snap action reciprocation of said hammer slide causing one of said hammers to deliver a blow to a tooth of a saw held in said vice, a second eccentric cam connected in synchronism with said first eccentric cam, feed pawl means contacting the surface of said second eccentric cam for feeding one tooth of a saw through said vice between each reciprocation of said hammer slide, power means for rotating said first and second cams, and a step adjustment means for determining the amount of feed imparted to a saw by said feed pawl means.

12. In a saw setter, a stationary member and an adjustable member for gripping a saw therein for the setting thereof, a pair of reciprocating hammers affixed together in spaced relation for setting successive teeth of a saw in opposite direction, means for reciprocating said hammers, a limit stop carried by each of said reciprocating hammers, a fixed limit stop positioned for cooperative engagement with the limit stop carried by one of said reciprocating hammers and an adjustable limit stop positioned for cooperative engagement with the limit stop carried by the other of said hammers and said fixed limit stops on said hammers cooperating with said fixed and adjustable limit stops for determining the limit of reciprocation of said hammers.

13. An improved saw setter comprising in combination a vice for gripping a saw therein for the setting thereof with the teeth of said saw extending therefrom, a pair of reciprocating hammers affixed together in spaced relation for bending successive teeth of a saw in opposite directions over one of the vice jaws, cam means for reciprocating said hammers, means for feeding successive teeth of said saw into position to be bent by one of said hammers, a limit stop carried by each of said reciprocating hammers, a limit stop fixed with reference to one jaw of said vice and a limit stop adjustable with reference to the other jaw of said vice, the limit stop on one of said hammers cooperable with said fixed stop and the stop on the other of said hammers cooperable with said adjustable stop for determining the limits of reciprocation of said hammers.

14. An improved saw setter comprising in combination vice means for gripping a saw therein for the setting thereof, a pair of reciprocating hammers affixed together in spaced relation for alternative reciprocation to set succesive teeth of the saw in opposite directions, means for reciprocating said hammers, said means for reciprocating said hammers comprising a cam means for the operation thereof and feed means operable in response to the actuation of said cam means operating in synchronism with the reciprocation of said hammers whereby a saw tooth will be fed to the vice after each reciprocation, said feed means comprising a saw tooth engaging member adapted for feeding said saw through said vice, a reciprocating shaft actuating said saw tooth engaging member, and adjustable means for determining the amount of reciprocation of said shaft.

15. An improved saw setter comprising in combination a vice for gripping a saw therein for the setting thereof, a pair of reciprocating hammers affixed together in spaced relation for setting successive teeth of a saw in opposite directions, means for reciprocating said hammers for delivering hammer blows to said successive teeth, said means for reciprocating said hammers including a resilient means, means operable for compressing said resilient means and then sharply releasing the same to cause a snap action reciprocation of said reciprocating hammers causing one of said hammers to deliver a blow to a tooth of a saw held in said vice.

16. The apparatus of claim 15 further characterized in that said means for reciprocating said hammers include eccentric cam means, a coil spring connected to said reciprocating hammers, and said eccentric cam means operable to compress said coil spring and then sharply release the same causing one of said hammers to deliver said blow.

17. An improved saw setter comprising in combination a vice for gripping a saw therein for the setting thereof, a pair of reciprocating hammers affixed together in spaced relation for setting successive teeth of a saw in opposite directions, means for reciprocating said hammers for delivering hammer blows to said successive teeth, means operable in response to the reciprocation of said hammers for feeding successive teeth of said saw into position to be set by one of said hammers, power means for actuating said reciprocating means, said vice comprising a pair of vice jaws positioned so that each vice jaw provides a ledge over which a saw tooth may be bent for the setting thereof, one of said vice jaws being fixed and one of said vice jaws being adjustable reciprocally for clamping a saw therebetween with said saw teeth extending therefrom, and limit stop means on said vice jaws cooperable with means on said reciprocating hammers for determining the limit of reciprocation of said hammers.

References Cited in the file of this patent

UNITED STATES PATENTS

| | | |
|---|---|---|
| 325,035 | Winston | Aug. 25, 1885 |
| 616,935 | Kent | Jan. 3, 1899 |
| 661,647 | Saxton | Nov. 13, 1900 |
| 712,229 | Young | Oct. 28, 1902 |
| 767,130 | Addison | Aug. 9, 1904 |
| 942,531 | Ambler | Dec. 7, 1909 |
| 1,078,855 | Holmes | Nov. 18, 1913 |
| 1,457,588 | Majewski | June 5, 1923 |
| 1,828,392 | Carpenter | Oct. 20, 1931 |
| 2,498,167 | Lorenz | Feb. 21, 1950 |
| 2,503,981 | Wilbert | Apr. 11, 1950 |

FOREIGN PATENTS

| | | |
|---|---|---|
| 1,079 | Netherlands | Jan. 1, 1916 |
| 225,859 | Germany | Sept. 20, 1910 |